United States Patent
Kubo (10) Patent No.: US 8,463,268 B2
(45) Date of Patent: Jun. 11, 2013

(54) MOBILE RADIO TERMINAL APPARATUS

(75) Inventor: Yoshiyuki Kubo, Ome (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 1328 days.

(21) Appl. No.: 11/439,819

(22) Filed: May 24, 2006

(65) Prior Publication Data

US 2006/0270402 A1    Nov. 30, 2006

(30) Foreign Application Priority Data

May 27, 2005   (JP) .................................. 2005-156206

(51) Int. Cl.
*H04W 4/00*   (2009.01)
(52) U.S. Cl.
USPC ..................... 455/435.3; 455/432.1; 455/433; 455/435.1; 455/435.2
(58) Field of Classification Search
USPC .......................................... 455/432.1–435.3
See application file for complete search history.

(56) References Cited

U.S. PATENT DOCUMENTS

| | | | |
|---|---|---|---|
| 6,826,414 B1 * | 11/2004 | Reynolds et al. | 455/555 |
| 6,947,746 B2 * | 9/2005 | Watanabe | 455/438 |
| 2003/0040313 A1 * | 2/2003 | Hogan et al. | 455/435 |
| 2003/0040314 A1 * | 2/2003 | Hogan et al. | 455/435 |
| 2003/0216140 A1 * | 11/2003 | Chambert | 455/426.1 |
| 2007/0004454 A1 * | 1/2007 | Schweiger et al. | 455/558 |

FOREIGN PATENT DOCUMENTS

| | | |
|---|---|---|
| JP | 07-264655 A | 10/1995 |
| JP | 09-181855 A | 7/1997 |
| JP | 2003-070047 A | 3/2003 |

* cited by examiner

*Primary Examiner* — Olumide T Ajibade Akonai
*Assistant Examiner* — Jaime Holliday
(74) *Attorney, Agent, or Firm* — Maschoff Brennan (57) ABSTRACT

A control unit stores identification information of a cell which has received cell information and identification information of a position registration area to which the cell belongs, in association with each other, in a cell information storage area, and stores identification information of a position registration area where previous position registration has been executed, in a position registration area storage area. Then, the control unit receives, with priority, the cell information relating to the cell stored in the cell information storage area, which has been detected and which belongs to the position registration area where previous position registration has been executed.

10 Claims, 6 Drawing Sheets

FIG. 1

| Spread codes | Search frequencies | Position registration area |
|---|---|---|
| $C_{125}$ | $f_1$ | 21fe |
| $C_{300}$ | $f_5$ | 21fe |
| $C_{200}$ | $f_{10}$ | 21fb |
| ⋮ | ⋮ | ⋮ |

MOBILE RADIO TERMINAL APPARATUS

CROSS-REFERENCE TO RELATED APPLICATIONS

This application is based upon and claims the benefit of priority from prior Japanese Patent Application No. 2005-156206, filed May 27, 2005, the entire contents of which are incorporated herein by reference.

BACKGROUND OF THE INVENTION

1. Field of the Invention

This invention relates to a mobile radio terminal apparatus to be employed in a mobile communications system of cellular telephones, etc.

2. Description of the Related Art

In a mobile communications system such as a cellular telephone system, each of a number of base stations forms a cell (radio zone). Each of the cells is handled as being in a predetermined position registration area by the system. a position of the mobile radio terminal apparatus is managed in association with the position registration area to which the selected cell belongs, and outgoing and incoming calls are processed.

A conventional mobile radio terminal apparatus discriminates whether or not position registration required for standby needs to be executed, on the basis of identification information of the position registration area included in information to be notified as received from the cell selected at the standby time (refer to, for example, 3rd Generation Partnership Project (3GPP) Standards TS23.122, TS25.304). When a cell is newly selected and the position registration area to which the selected cell belongs is different from the position registration area of the previously selected cell, standby can be executed, too, in the newly selected cell, by executing the position registration.

Under the 3GPP Standards TS23.122, TS25.304), when a cell is selected and then the position registration is executed, the terminal apparatus becomes in the connection mode associated with the transmission to the cell. When the position registration is completed and the connection mode is ended, a cell is selected.

For this reason, if the cell selected by the cell selection belongs to the position registration area different from the area where the position registration has been executed, position registration is executed again immediately after the previous position registration.

This state may be caused particularly in a case where the terminal is located in an environment where a plurality of cells having different position registration areas are close to each other. For this reason, the position registration is executed at every cell selection and the battery power is wasted, in the worst case.

In the conventional mobile radio terminal apparatus, position registration is executed again in accordance with the cell selection after the position registration has been executed. The battery power is thereby wasted.

BRIEF SUMMARY OF THE INVENTION

The present invention has been accomplished to solve the above-described problems. The object of the present invention is to provide a mobile radio terminal apparatus capable of restricting the execution of unnecessary position registration and decreasing the power consumption.

To achieve this object, an aspect of the present invention is a mobile radio terminal apparatus, for use in a mobile radio communications system including a plurality of cells belonging to different position registration areas, to make radio communications through the cells. The apparatus comprises a receiver for receiving from the cells cell information including identification information of the position registration areas to which the cells belong, a position registration area memory for storing the identification information of one of the position registration areas where previous position registration has been executed, a cell information memory for storing the identification information of the position registration area included in the cell information and the identification information of the cells in association with each other if the cell information is received from the cells, and a controller for controlling the receiver to specify the cell belonging to the position registration area stored by the position registration area memory and receive the cell information from the cell with priority, on the basis of the information stored by the position registration area memory and the information stored by the cell information memory.

According to the present invention, a mobile radio terminal apparatus capable of restricting unnecessary occurrence of the position registration and reducing the power consumption can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be explained below with reference to the accompanying drawings.

Figure 1:
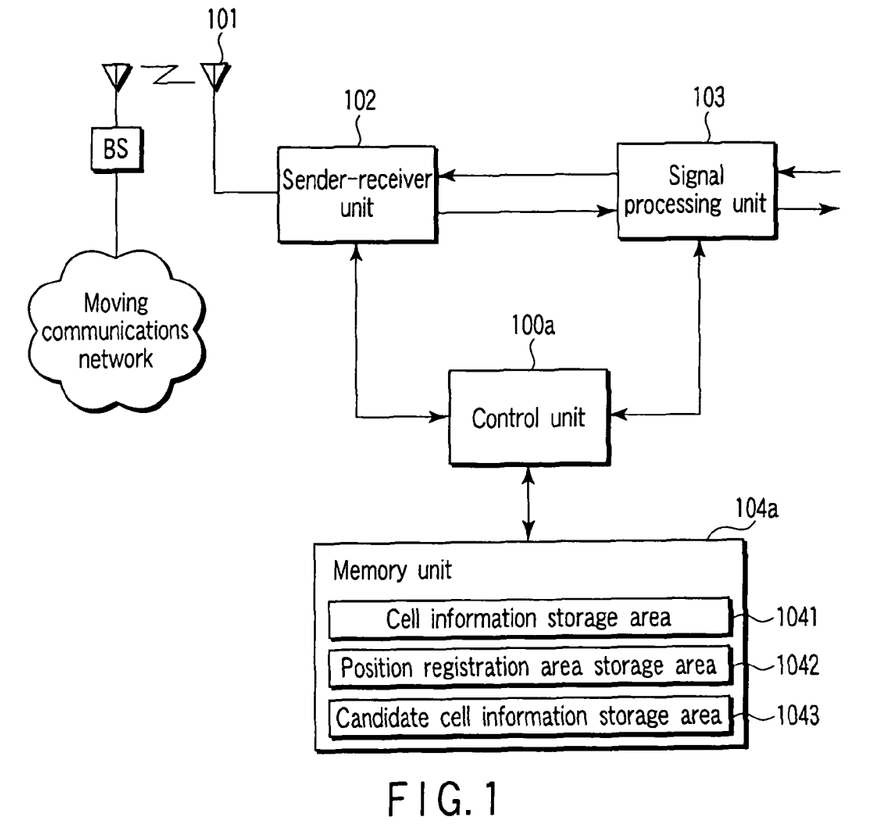
FIG. 1 is a block diagram showing a mobile radio terminal apparatus according to a first embodiment of the present invention.

FIG. 1 shows a structure of a mobile radio terminal apparatus according to a first embodiment of the present invention. The mobile radio terminal apparatus comprises an antenna

101, a sender-receiver unit 102, a signal processing unit 103, a memory unit 104a, and a control unit 100a. As an example of the mobile radio terminal apparatus, an apparatus employed in a mobile radio communications system of W-CDMA (Wideband Code Division Multiple Access) scheme to conduct voice and data communications, will be described here.

The sender-receiver unit 102 conducts W-CDMA radio communications with a base station BS accommodated in a mobile communications network via the antenna 101. Specifically, the sender-receiver unit 102 generates a radio signal of a carrier frequency instructed by the control unit 100a, on the basis of a modulation signal generated by the signal processing unit 103.

In addition, the sender-receiver unit 102 receives a radio signal of a carrier frequency instructed by the control unit 100a. The reception result is output to the signal processing unit 103 and the control unit 100a. Spread codes utilized at the reception of the radio signal are instructed by the control unit 100a. The sender-receiver unit 102 comprises a function of detecting a reception level of a receive signal obtained by despreading, and notifies the control unit 100a of the detected reception level.

The signal processing unit 103 encodes a transmit speech signal. In addition, the signal processing unit 103 generates the modulation signal on the basis of the speech data obtained by encoding or other data, and outputs the generated modulation signal to the sender-receiver unit 102. Moreover, the signal processing unit 103 demodulates the signal received by the sender-receiver unit 102, and decodes a result of the demodulation to obtain the speech data and the like.

The memory unit 104a stores control programs and control data of the own mobile radio terminal apparatus, and inherent identification information assigned to the mobile radio terminal apparatus and its user, in addition to telephone directory data in which names correspond to telephone numbers, data obtained from data communications, and downloaded data. In addition, the memory unit 104a comprises a cell information storage area 1041, a position registration area storage area 1042 and a candidate cell information storage area 1043.

Figure 2:
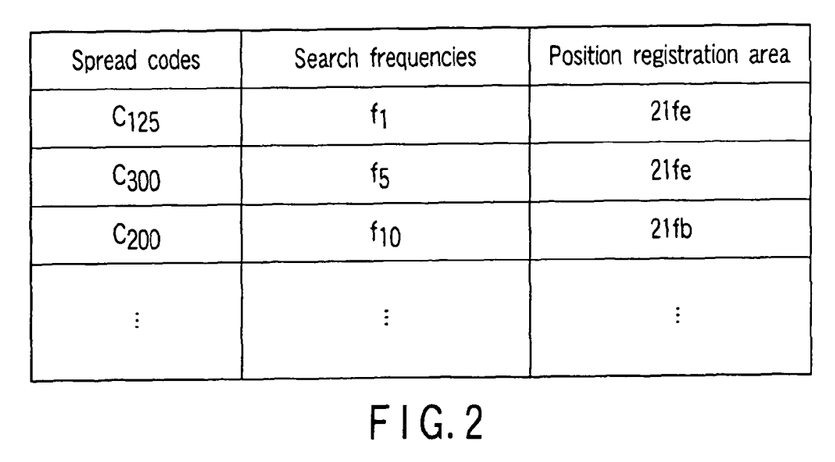
FIG. 2 is a table showing an example of information stored in a cell information storage area of a memory unit of the mobile radio terminal apparatus shown in FIG. 1.

In the cell information storage area 1041, identification information of spread codes corresponding to cells previously selected for incoming call standby (hereinafter simply called standby), identification information of search frequencies used to receive pilot signals transmitted from the cells, and identification information of position registration areas to which the cells belong are stored in association with one another as shown in FIG. 2.

For convenience of packaging, for example, approximately ten sets of information are stored in the cell information storage area 1041. Writing the information in the cell information storage area 1041 is executed by the control unit 100a.

The information items stored in the cell information storage area 1041 are stored in time series such that new information items and old information items can be discriminated. If information is additionally stored by the control unit 100a, the additional information is stored as the latest information. At this addition, the oldest information item is deleted. If information is updated and stored by the control unit 100a, the original information is updated and stored as the latest information.

In the position registration area storage area 1042, identification information of the position registration area where the previous position registration has been executed is stored.

In the candidate cell information storage area 1043, information about a cell detected by the cell searching is stored.

The control unit 100a controls each unit of the mobile radio terminal apparatus on the basis of the control program and control data stored in the memory unit 104a. Specifically, the control unit 100a controls carrier frequencies and spread codes used by the sender-receiver unit 102 and operations of the signal processing unit 103, besides searching for cells capable of communications, position registration, outgoing and incoming calls, communications, etc.

The mobile radio terminal apparatus comprises a speaker which outputs a receive speech signal, a microphone which inputs a send speech signal, means for converting the speech data into the receive speech signal, means for converting the send speech signal into the speech data, display means for displaying images on the basis of the receive data, an operation unit which accepts a request for the user, and the like, though they are not shown in FIG. 1.

FIG. 1 illustrates only one base station BS. In fact, however, a number of base stations are present and each of them forms a cell predetermined by the system. The position registration area is formed by at least one cell. Each base station BS periodically transmits the cell information. The cell information includes information about the base station BS which has sent the cell information, identification information of the position registration area to which the base station belongs.

Next, operations of the mobile radio terminal apparatus having the above-explained structure are described. In the following descriptions, steps of establishing a communications link with a base station BS, control to implement the speech and data communications, registration, call and editing of the telephone directory data, and the like are omitted, but operations about selection of the base station BS with which communications should be made are described.

Figure 3:
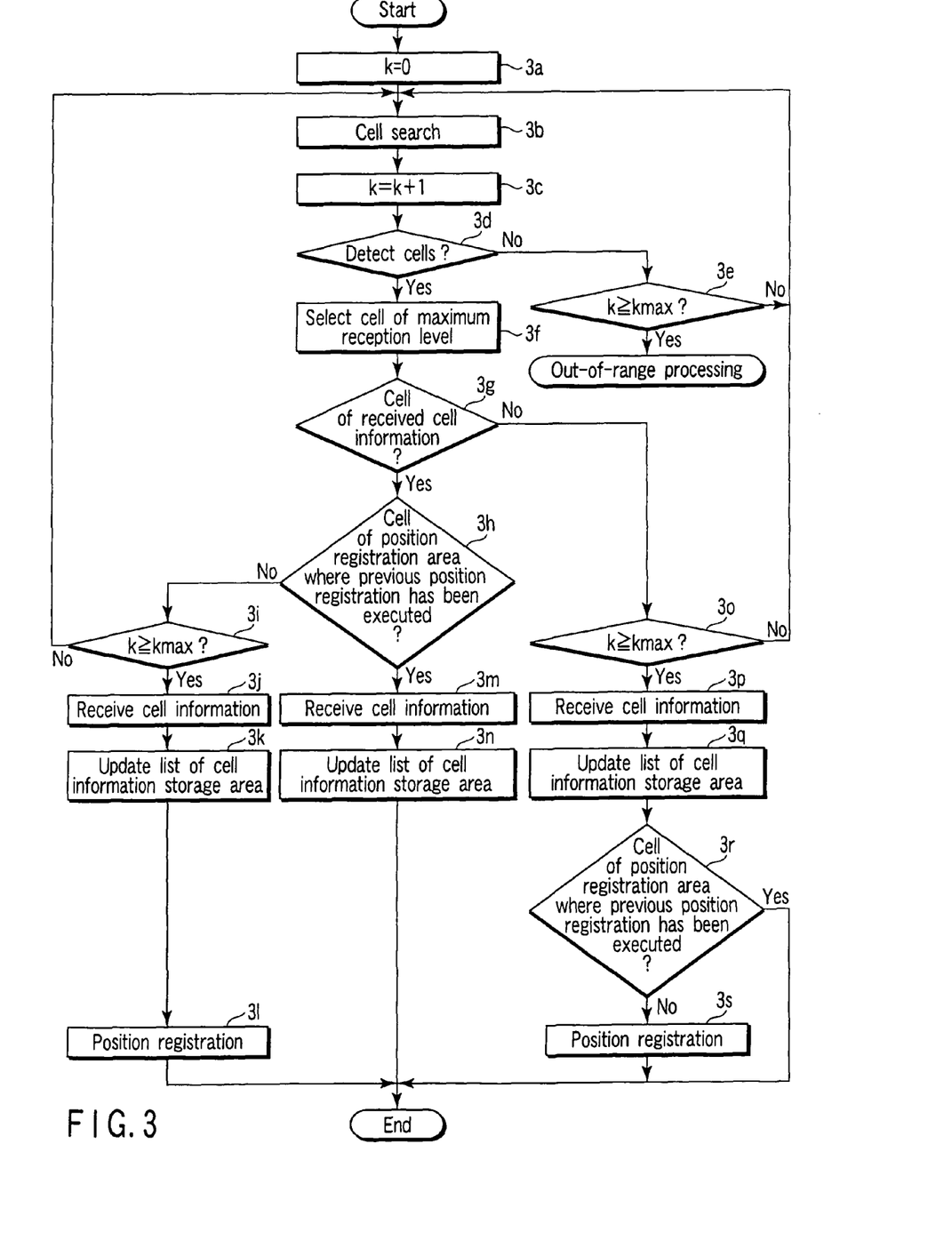
FIG. 3 is a flowchart showing operations of the mobile radio terminal apparatus shown in FIG. 1.

FIG. 3 is a flowchart of operations of selecting a base station BS with which communications should be made. This processing is executed by the control unit 100a. The control program for implementing the control illustrated in this flowchart is stored in the memory unit 104a. This processing is executed at the power-on, after disconnection, at the reselection of the standby time, or at the time when the selection of the base station BS as provided under the 3GPP Standards is required.

First, the control unit 100a sets a counter value k representing the number of execution of the cell search at an initial value 0 in step 3a, and proceeds to step 3b. The control unit 100a executes the cell search and stores the information of the detected cells in the candidate cell information storage area 1043 in step 3b, and proceeds to step 3c.

The concrete processing of the cell search is controlling the sender-receiver unit 102, sequentially assigning various kinds of carrier frequencies and spread codes thereto, searching for a pilot signal transmitted from the base station BS, detecting maximum number n of cells suitable for reception (n>1), deleting the cell information which has been stored in the candidate cell information storage area 1043 (i.e. the information which has been obtained at the previous cell search), and storing the reception levels of the pilot signals corresponding to the cells detected at the current cell search, and each of identification information items of the frequencies and spread codes used for the reception, in association with each other, in the candidate cell information storage area 1043.

The control unit 100a adds "1" to the counter value k in step 3c, and proceeds to step 3d.

In step 3d, the control unit 100a discriminates whether or not the cells could be successfully detected by the cell search executed in step 3b, by referring to the information stored in the candidate cell information storage area 1043. If the cells could be successfully detected, control unit 100a proceeds to step 3f. If the cells could not be detected, control unit 100a proceeds to step 3e.

In step 3e, the control unit 100a discriminates whether or not the counter value k is equal to or greater than a preset threshold value kmax. If the counter value k is equal to or greater than a preset threshold value kmax, i.e. if the cell search of step 3b is executed at kmax or more times, the control unit 100a ends this processing, urges the display means to display that the radio communication terminal is located out of service area, and executes the out-of-area processing.

On the other hand, if the counter value k is smaller than the preset threshold value kmax, i.e. if the cell search of step 3b is not executed at kmax or more times, the control unit 100a proceeds to step 3b and executes the cell search again.

In step 3f, the control unit 100a selects the cell corresponding to the pilot signal of the highest reception level, of the cells stored in the candidate cell information storage area 1043 in step 3b. Then, the control unit 100a proceeds to step 3g.

In step 3g, the control unit 100a discriminates whether or not the cell selected in step 3f is stored in the cell information storage area 1041, by referring to the identification information of the spread codes stored in the cell information storage area 1041.

If the cell selected in step 3f is stored in the cell information storage area 1041, the control unit 100a discriminates the selected cell as the cell, which has been detected, and proceeds to step 3h. If the cell selected in step 3f is not stored in the cell information storage area 1041, the control unit 100a discriminates the selected cell as the cell which has not been detected, and proceeds to step 3o.

In step 3h, the control unit 100a detects the identification information of the position registration area which is associated with the cell selected in step 3f in the cell information storage area 1041, and discriminates whether or not the detected identification information matches the identification information of the position registration area where the previous position registration has been executed as stored in the position registration area storage area 1042. If the identification information items of the two position registration areas match, the control unit 100a proceeds to step 3m. If the identification information items do not match, the control unit 100a proceeds to step 3i.

In step 3i, the control unit 100a discriminates whether or not the counter value k is equal to or greater than the preset threshold value kmax. If the counter value k is equal to or greater than the threshold value kmax, i.e. if the cell search of step 3b is executed at kmax or more times, the control unit 100a proceeds to step 3j to receive the cell information from the cell selected in step 3f.

If the counter value k is smaller than the threshold value kmax, i.e. if the cell search of step 3b is not executed at kmax or more times, the control unit 100a proceeds again to step 3b and executes the cell search again.

In step 3j, the control unit 100a reads the identification information of the frequency and spread code corresponding to the cell selected in step 3f from the cell information storage area 1041, controls the sender-receiver unit 102 on the basis of these information items, and receives the cell information transmitted from the base station BS corresponding to the cell selected in step 3f. Then, the control unit 100a proceeds to step 3k.

In step 3k, the control unit 100a updates the information corresponding to the cell selected in step 3f, of the information stored in the cell information storage area 1041, on the basis of the cell information received in step 3j. Then, the control unit 100a proceeds to step 3l. By the updating, the cell information received in step 3j is stored in the cell information storage area 1041 as the latest information.

In step 3l, the control unit 100a controls the sender-receiver unit 102 on the basis of the information received in step 3j and executes the position registration processing through the cell selected in step 3f. In the mobile communications system accommodating the base station BS, the mobile radio terminal apparatus thereby executes various kinds of controls such as sending and receiving as if the terminal apparatus existed in the cell selected in step 3f.

In step 3l, the control unit 100a also stores the identification information of the position registration area corresponding to the cell selected in step 3f, as the area where the previous position registration has been executed, in the position registration area storage area 1042, and ends the processing.

In step 3m, the control unit 100a reads the identification information of the frequency and spread code corresponding to the cell selected in step 3f from the cell information storage area 1041, controls the sender-receiver unit 102 on the basis of these information items, and receives the cell information transmitted from the base station BS corresponding to the cell selected in step 3f. Then, the control unit 100a proceeds to step 3n.

In step 3n, the control unit 100a updates the information corresponding to the cell selected in step 3f, of the information stored in the cell information storage area 1041, on the basis of the cell information received in step 3m, and ends this processing. By the updating, the cell information received in step 3m is stored in the cell information storage area 1041 as the latest information.

In step 3o, the control unit 100a discriminates whether or not the counter value k is equal to or greater than the preset threshold value kmax. If the counter value k is equal to or greater than the threshold value kmax, i.e. if the cell search of step 3b is executed at kmax or more times, the control unit 100a proceeds to step 3p to receive the cell information from the cell selected in step 3f.

If the counter value k is smaller than the threshold value kmax, i.e. if the cell search of step 3b is not executed at kmax or more times, the control unit 100a proceeds again to step 3b and executes the cell search again.

In step 3p, the control unit 100a reads the identification information of the frequency and spread code corresponding to the cell selected in step 3f from the cell information storage area 1041, controls the sender-receiver unit 102 on the basis of these information items, and receives the cell information transmitted from the base station BS corresponding to the cell selected in step 3f. Then, the control unit 100a proceeds to step 3q.

In step 3q, on the basis of the cell information received in step 3p, the control unit 100a additionally stores the identification information of the spread code corresponding to the cell selected in step 3f, the identification information of the search frequency utilized to receive the pilot signal transmitted from the cell, and the identification information of the position registration area to which the cell belongs, in association with one another, as the latest information, in the cell information storage area 1041. Then, the control unit 100a proceeds to step 3r. By the additional storeing, the oldest information, of the information items stored in the cell information storage area 1041, is deleted.

In step 3r, the control unit 100a detects the identification information of the position registration area corresponding to the cell selected in step 3f in the cell information storage area 1041 and discriminates whether or not the detected identification information matches the identification information of the position registration area which is stored in the position registration area storage area 1042 and in which the previous position registration has been executed. If the identification information items of the two position registration areas match, the control unit 100*a* ends the processing. If the identification information items of the two position registration areas do not match, the control unit 100*a* proceeds to step 3*s*.

In step 3*s*, the control unit 100*a* controls the sender-receiver unit 102 on the basis of the information received in step 3*p* and executes the position registration through the cell selected in step 3*f*. In the mobile communications system accommodating the base station BS, the mobile radio terminal apparatus thereby executes various kinds of controls such as sending and receiving as if the terminal apparatus existed in the cell selected in step 3*f*.

In step 3*s*, the control unit 100*a* stores the identification information of the position registration area corresponding to the cell selected in step 3*f*, as the area where the previous position registration has been executed, in the position registration area storage area 1042, and ends the processing.

In the mobile radio terminal apparatus having the above-described structure, the identification information of the cell which has received the cell information, and the identification information of the position registration area to which the cell belongs, are stored in association with each other, in the cell information storage area 1041, and the identification information of the position registration area where the previous position registration has been executed is stored in the position registration area storage area 1042.

If, as a result of the cell search, the detected cell is not stored in the cell information storage area 1041, i.e. the detected cell has not been detected or does not belong to the position registration area where the previous position registration has been executed, the cell search is executed again.

On the other hand, the cell information is received with priority, in relation to the cell stored in the cell information storage area 1041, which has been detected and which belongs to the position registration area where the previous position registration has been executed. In other words, the cell which has been detected and which belongs to the position registration area where the previous position registration has been executed, is handled as a cell relating to the cell information which is to be received with priority.

Therefore, according to the mobile radio terminal apparatus having the above-described structure, even if the cell information is received, the position registration does not need to be executed, in relation to the cell which has been detected and which belongs to the position registration area where the previous position registration has been executed. By handling such a cell as a cell relating to the cell information which is to be received with priority, the number of execution of the position registration can be decreased, unnecessary occurrence of the position registration can be thereby restricted and the power consumption can be reduced.

If, as a result of the cell search, the detected cell is not stored in the cell information storage area 1041, i.e. the detected cell has not been detected or does not belong to the position registration area where the previous position registration has been executed, the cell search is executed again. However, when the number of execution of the cell search reaches the threshold value kmax, the cell information is received and the position registration is executed even if the cell is not stored in the cell information storage area 1041 or does not belong to the position registration area where the previous position registration has been executed.

For this reason, even if the cell which is stored in the cell information storage area 1041 and which belongs to the position registration area where the previous position registration has been executed cannot be found, the position registration is executed soon. Even if the position registration needs to be executed together with the movement of the mobile radio terminal apparatus, normal operations can be executed.

The present invention is not limited to the embodiment described above but can be modified in various manners. For example, the counter value k is incremented in step 3*c*, commonly to the proceeding from step 3*a* to step 3*b*, the proceeding from step 3*e* to step 3*b*, the proceeding from step 3*i* to step 3*b*, and the proceeding from step 3*o* to step 3*b*.

Instead of this, for example, different counter values k may be used in accordance with the processes of proceeding to step 3*b*, and the counter values k corresponding to steps 3*e*, 3*i* and 3*o* may be discriminated in the respective steps.

Figure 4:
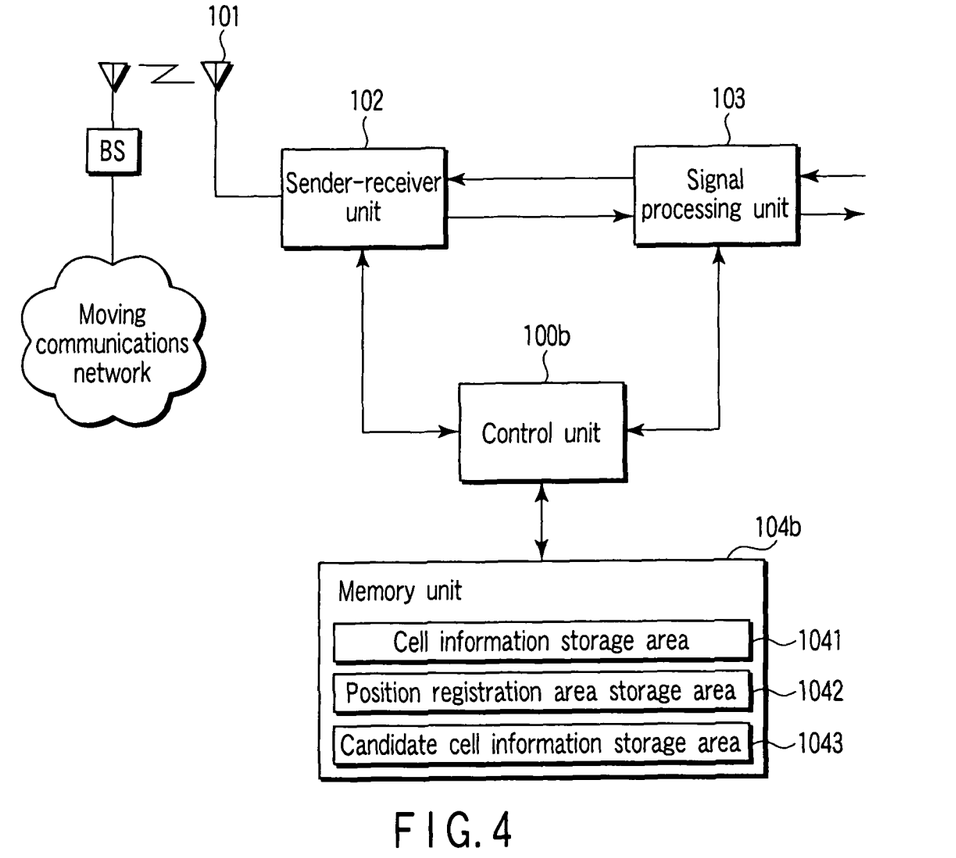
FIG. 4 is a block diagram showing a mobile radio terminal apparatus according to a second embodiment of the present invention.

Next, a mobile radio terminal apparatus according to a second embodiment of the present invention is described. FIG. 4 shows a structure of the mobile radio terminal apparatus. The mobile radio terminal apparatus shown in FIG. 4 has the same structure as that of the mobile radio terminal apparatus shown in FIG. 1, but is different in a control operation of selecting the base station BS with which communications should be made, as described later. As the control means for implementing this operation, a control unit 100*b* is provided instead of the control unit 100*a* and a memory unit 104*b* is provided instead of the memory unit 104*a*.

The control unit 100*b* controls each unit of the mobile radio terminal apparatus on the basis of the control program and control data stored in the memory unit 104*b*. Specifically, the control unit 100*b* controls carrier frequencies and spread codes used by the sender-receiver unit 102 and operations of the signal processing unit 103, besides searching for cells capable of communications, position registration, outgoing and incoming calls, communications, etc.

The memory unit 104*b* stores control programs and control data of the own mobile radio terminal apparatus, and inherent identification information assigned to the mobile radio terminal apparatus and its user, in addition to telephone directory data in which names correspond to telephone numbers, data obtained from data communications, and downloaded data. In addition, the memory unit 104*b* comprises the cell information storage area 1041, the position registration area storage area 1042 and the candidate cell information storage area 1043.

Next, operations of the mobile radio terminal apparatus having the above-explained structure are described. In the following descriptions, steps of establishing a communications link with the base station BS, control to implement the speech and data communications, registration, call and editing of the telephone directory data, and the like are omitted, but operations about selection of the base station BS with which communications should be made are described.

Figure 5:
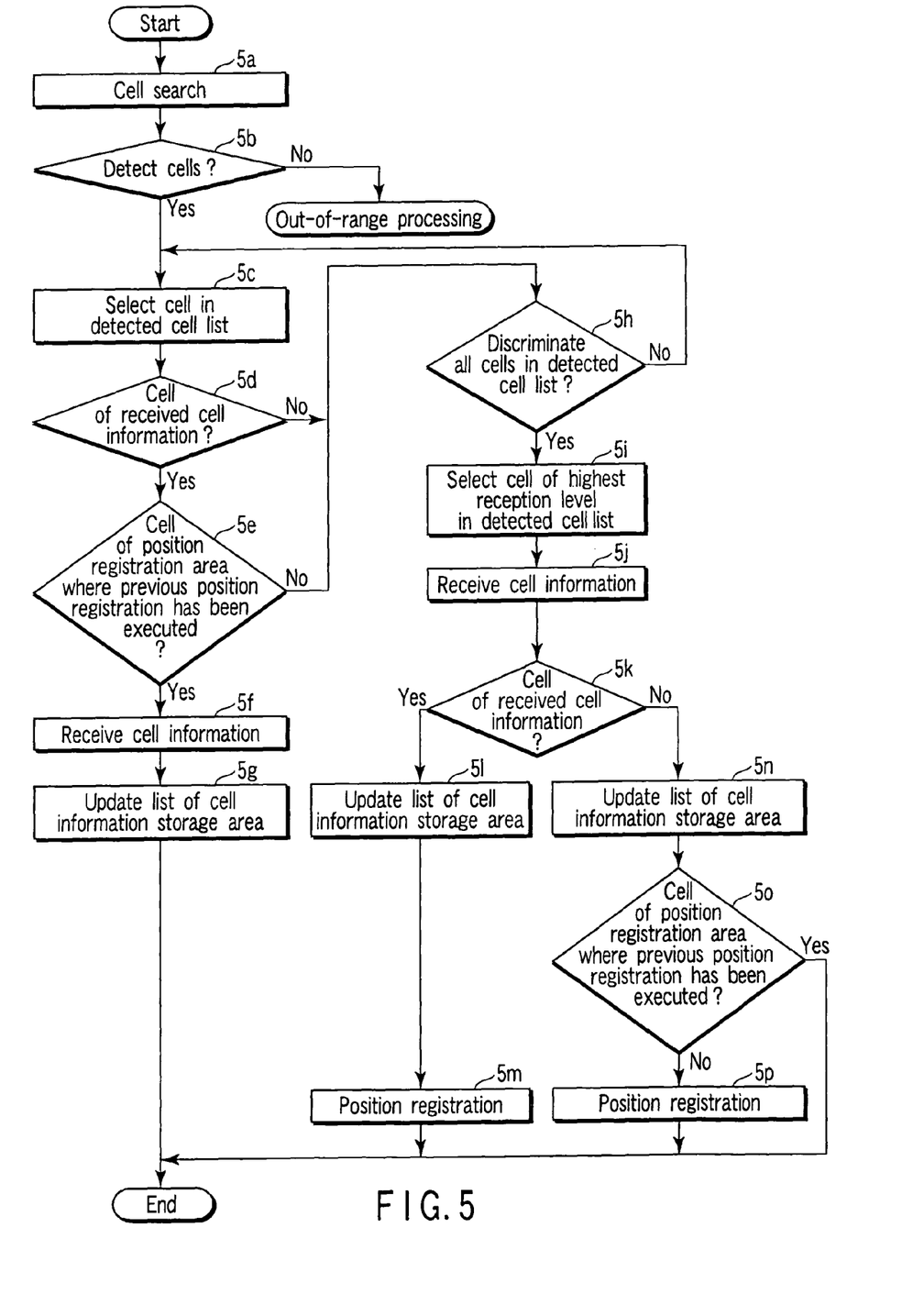
FIG. 5 is a flowchart showing operations of the mobile radio terminal apparatus shown in FIG. 4.

FIG. 5 is a flowchart of operations of selecting the base station BS with which communications should be made. This processing is executed by the control unit 100*b*. The control program for implementing the control illustrated in this flowchart is stored in the memory unit 104*b*. This processing is executed at the power-on, after disconnection, at the reselection of the standby time, or at the time when the selection of the base station BS as provided under the 3GPP Standards is required.

First, the control unit 100*b* executes the cell search and stores the information of the cells detected in the cell search in the candidate cell information storage area 1043 in step 5*a*, and proceeds to step 5*b*.

The concrete processing of the cell search is controlling the sender-receiver unit 102, sequentially assigning various kinds of carrier frequencies and spread codes thereto, searching for a pilot signal transmitted from the base station BS, detecting maximum number n of cells suitable for reception (n>1), deleting the cell information which has been stored in the candidate cell information storage area 1043 (i.e. the information which has been obtained at the previous cell search), and storing the reception levels of the pilot signals corresponding to the cells detected at the current cell search, and each of identification information items of the frequencies and spread codes used for the reception, in association with each other, in the candidate cell information storage area 1043.

In step 5b, the control unit 100b discriminates whether or not the cells could be successfully detected by the cell search executed in step 5a, by referring to the information stored in the candidate cell information storage area 1043. If the cells could be successfully detected, control unit 100b proceeds to step 5c. If the cells could not be detected, control unit 100b ends this processing, urges the display means to display that the radio communication terminal is located out of the service area, and executes the out-of-area processing.

The control unit 100b selects one of the cells stored in the candidate cell information storage area 1043 in step 5a, in step 5c, and proceeds to step 5d. As the cell section of step 5c is repeated in the proceeding from step 5h to be described later, the cell which has not been selected by the previous transfer is selected. As for the order of priority in the cell selection, the cell corresponding to the pilot signal of the highest reception level is considered to be first selected.

In step 5d, control unit 100b discriminates whether or not the cell selected in step 5c is stored in the cell information storage area 1041, by referring to the identification information of the spread codes stored in the cell information storage area 1041.

If the cell selected in step 5c is stored in the cell information storage area 1041, the control unit 100b discriminates the selected cell as the cell which has been detected, and proceeds to step 5e. If the cell selected in step 5c is not stored in the cell information storage area 1041, the control unit 100b discriminates the selected cell as the cell which has not been detected, and proceeds to step 5h.

In step 5e, the control unit 100b detects the identification information of the position registration area which is associated with the cell selected in step 5c in the cell information storage area 1041, and discriminates whether or not the detected identification information matches the identification information of the position registration area where the previous position registration has been executed as stored in the position registration area storage area 1042. If the identification information items of the two position registration areas match, the control unit 100b proceeds to step 5f. If the identification information items do not match, the control unit 100b proceeds to step 5h.

In step 5f, the control unit 100b reads the identification information of the frequency and spread code corresponding to the cell selected in step 5c from the cell information storage area 1041, controls the sender-receiver unit 102 on the basis of these information items, and receives the cell information transmitted from the base station BS corresponding to the cell selected in step 5c. Then, the control unit 100b proceeds to step 5g.

In step 5g, the control unit 100b updates the information corresponding to the cell selected in step 5c, of the information stored in the cell information storage area 1041, on the basis of the cell information received in step 5f. Then, the control unit 100b ends the processing. By the updating, the cell information received in step 5f is stored in the cell information storage area 1041 as the latest information.

On the other hand, in step 5h, the control unit 100b discriminates whether or not all of the cells stored in the candidate cell information storage area 1043 in step 5a have been selected in the processing of step 5c. If all of the cells have been selected, the control unit 100b proceeds to step 5i. If the cells which have not been selected still exist in the candidate cell information storage area 1043, the control unit 100b proceeds to step 5c and selects the remaining cells.

The control unit 100b selects the cell corresponding to the pilot signal of the highest reception level, of the cells stored in the candidate cell information storage area 1043, in step 5i, and proceeds to step 5j.

In step 5j, the control unit 100b reads the identification information of the frequency and spread code corresponding to the cell selected in step 5i from the cell information storage area 1041, controls the sender-receiver unit 102 on the basis of these information items, and receives the cell information transmitted from the base station BS corresponding to the cell selected in step 5i. Then, the control unit 100b proceeds to step 5k.

In step 5k, control unit 100b discriminates whether or not the cell selected in step 5i is stored in the cell information storage area 1041, by referring to the identification information of the spread codes stored in the cell information storage area 1041.

If the cell selected in step 5i is stored in the cell information storage area 1041, the control unit 100b discriminates the selected cell as the cell which has been detected, and proceeds to step 5l. If the cell selected in step 5i is not stored in the cell information storage area 1041, the control unit 100b discriminates the selected cell as the cell which has not been detected, and proceeds to step 5n.

The control unit 100b updates the information corresponding to the cell selected in step 5i, of the information stored in the cell information storage area 1041, on the basis of the cell information received in step 5j, in step 5l, and proceeds to step 5m. By the updating, the cell information received in step 5i is stored in the cell information storage area 1041 as the latest information.

In step 5m, the control unit 100b controls the sender-receiver unit 102 on the basis of the information received in step 5j and executes the position registration processing through the cell selected in step 5i. In the mobile communications system accommodating the base station BS, the mobile radio terminal apparatus thereby executes various kinds of controls such as sending and receiving as if the terminal apparatus existed in the cell selected in step 5i.

In step 5m, the control unit 100b also stores the identification information of the position registration area corresponding to the cell selected in step 5i, as the area where the previous position registration has been executed, in the position registration area storage area 1042, and ends the processing.

On the other hand, in step 5n, on the basis of the cell information received in step 5j, the control unit 100b additionally stores the identification information of the spread code corresponding to the cell selected in step 5i, the identification information of the search frequency utilized to receive the pilot signal transmitted from the cell, and the identification information of the position registration area to which the cell belongs, in association with one another, as the latest information, in the cell information storage area 1041. Then, the control unit 100b proceeds to step 5o. By the additional storing, the oldest information, of the information items stored in the cell information storage area 1041, is deleted.

In step 5o, the control unit 100b detects the identification information of the position registration area corresponding to the cell selected in step 5i in the cell information storage area 1041 and discriminates whether or not the detected identification information matches the identification information of the position registration area which is stored in the position registration area storage area 1042 and in which the previous position registration has been executed. If the identification information items of the two position registration areas match, the control unit 100b ends the processing. If the identification information items of the two position registration areas do not match, the control unit 100b proceeds to step 5p.

In step 5p, the control unit 100b controls the sender-receiver unit 102 on the basis of the information received in step 5j and executes the position registration through the cell selected in step 5i. In the mobile communications system accommodating the base station BS, the mobile radio terminal apparatus thereby executes various kinds of controls such as sending and receiving as if the terminal apparatus existed in the cell selected in step 5i.

In step 5p, the control unit 100b stores the identification information of the position registration area corresponding to the cell selected in step 5i, as the area where the previous position registration has been executed, in the position registration area storage area 1042, and ends the processing.

In the mobile radio terminal apparatus having the above-described structure, the identification information of the cell which has received the cell information, and the identification information of the position registration area to which the cell belongs, are stored in association with each other, in the cell information storage area 1041, and the identification information of the position registration area where the previous position registration has been executed is stored in the position registration area storage area 1042.

A plurality of cells are detected by the cell search. The notification information is received with priority, in relation to the cell, of the detected cells, which is stored in the cell information storage area 1041, which has been detected, and which belongs to the position registration area where the previous position registration has been executed.

Therefore, according to the mobile radio terminal apparatus having the above-described structure, even if the cell information is received, the position registration does not need to be executed, in relation to the cell which has been detected and which belongs to the position registration area where the previous position registration has been executed. By handling such a cell as a cell relating to the cell information which is to be received with priority, the number of execution of the position registration can be decreased, unnecessary occurrence of the position registration can be thereby restricted and the power consumption can be reduced.

If, as a result of the cell search, all of the detected cells are not stored in the cell information storage area 1041, i.e. the detected cells have not been detected or do not belong to the position registration area where the previous position registration has been executed, the cell information is received and the position registration is executed in relation to cells having higher reception level, of the detected cells, with priority.

For this reason, even if the cell which is stored in the cell information storage area 1041 and which belongs to the position registration area where the previous position registration has been executed cannot be found, the position registration is executed soon. Even if the position registration needs to be executed together with the movement of the mobile radio terminal apparatus, the mobile radio terminal apparatus can be normally operated.

Figure 6:
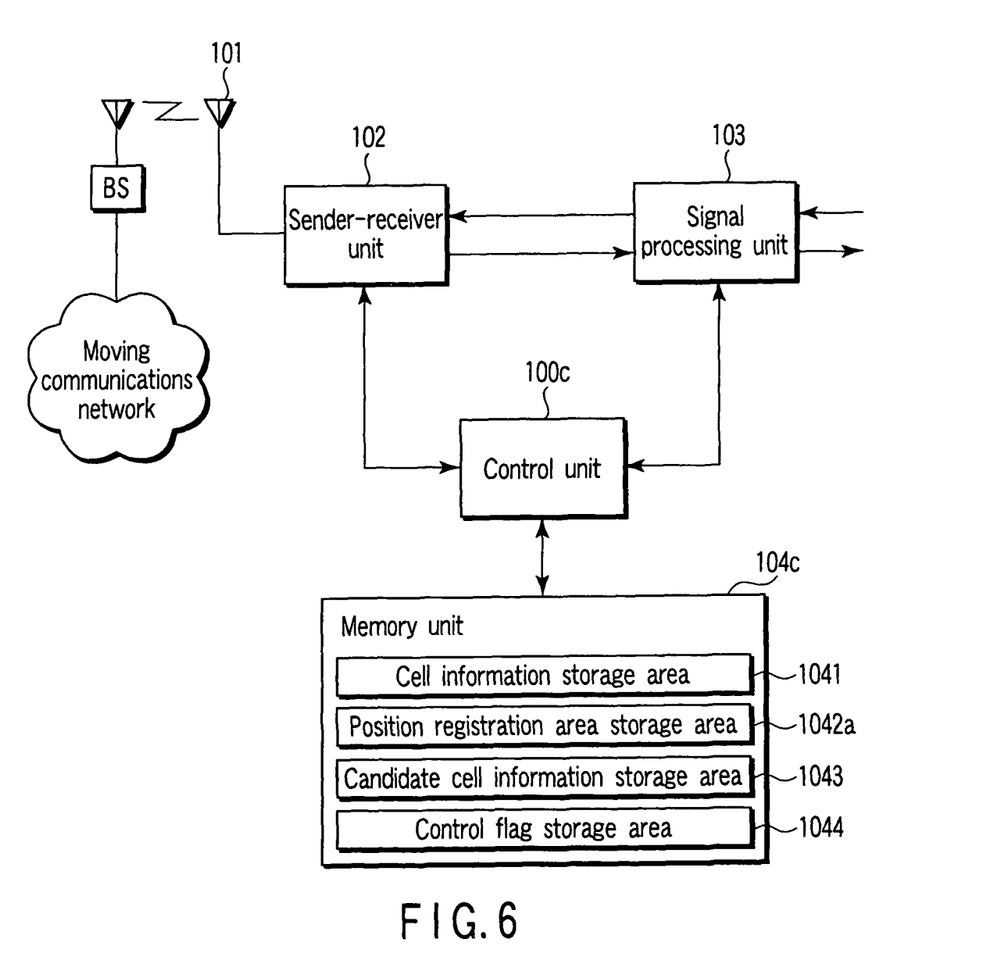
FIG. 6 is a block diagram showing a mobile radio terminal apparatus according to a third embodiment of the present invention.

Next, a mobile radio terminal apparatus according to a third embodiment of the present invention is described. FIG. 6 shows a structure of the mobile radio terminal apparatus. The mobile radio terminal apparatus shown in FIG. 6 has the same structure as that of the mobile radio terminal apparatus shown in FIG. 1, but is different in a control operation of selecting the base station BS with which communications should be made, as described later. As the control means for implementing this operation, a control unit 100c is provided instead of the control unit 100a and a memory unit 104c is provided instead of the memory unit 104a.

The control unit 100c controls each unit of the mobile radio terminal apparatus on the basis of the control program and control data stored in the memory unit 104c. Specifically, the control unit 100c controls carrier frequencies and spread codes used by the sender-receiver unit 102 and operations of the signal processing unit 103, besides searching for cells capable of communications, position registration, outgoing and incoming calls, communications, etc.

The memory unit 104c stores control programs and control data of the own mobile radio terminal apparatus, and inherent identification information assigned to the mobile radio terminal apparatus and its user, in addition to telephone directory data in which names correspond to telephone numbers, data obtained from data communications, and downloaded data.

In addition, the memory unit 104c comprises the cell information storage area 1041, a position registration area storage area 1042a and the candidate cell information storage area 1043, similarly to the memory unit 104a, and further comprises a control flag storage area 1044.

The position registration area storage area 1042a is an area in which identification information of a position registration area where the previous position registration has been executed is stored. Information indicating whether or not a reject signal (refer to 3GPP Standards TS24.008) representing rejecting connections except emergency communications has been received, at the position registration, is stored in the position registration area storage area 1042a.

Next, operations of the mobile radio terminal apparatus having the above-explained structure are described. In the following descriptions, steps of establishing a communications link with the base station BS, control to implement the speech and data communications, registration, call and editing of the telephone directory data, and the like are omitted, but operations about selection of the base station BS with which communications should be made are described.

Figure 7:
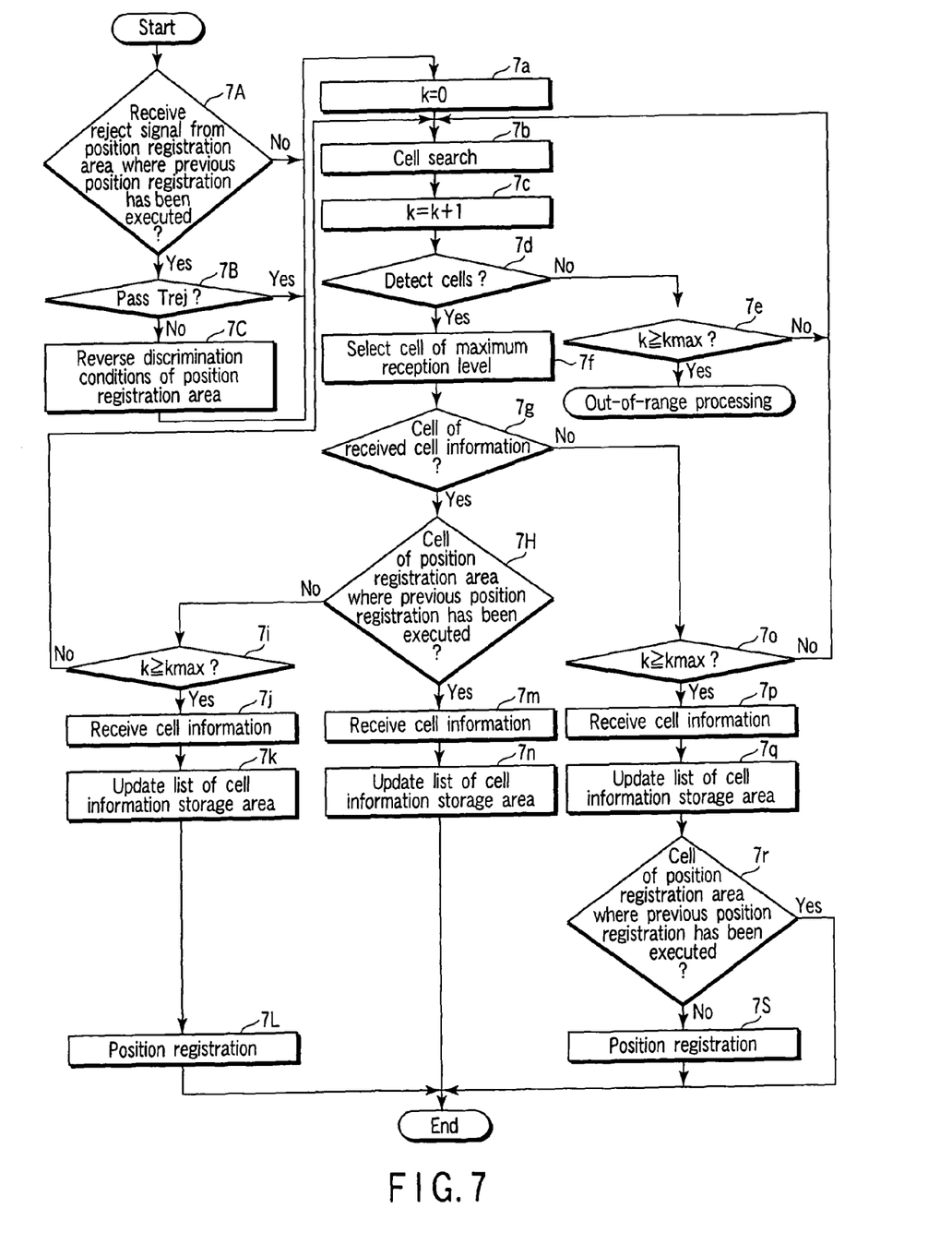
FIG. 7 is a flowchart showing operations of the mobile radio terminal apparatus shown in FIG. 6.

FIG. 7 is a flowchart of operations of selecting a base station BS with which communications should be made. This processing is executed by the control unit 100c. The control program for implementing the control illustrated in this flowchart is stored in the memory unit 104c. This processing is executed at the power-on, after disconnection, at the reselection of the standby time, or at the time when the selection of the base station BS as provided under the 3GPP Standards is required.

First, in step 7A, the control unit 100c discriminates whether or not the reject signal has been received from the position registration area where the previous position registration has been executed, by referring to the position registration area storage area 1042a. If the reject signal has been received, the control unit 100c proceeds to step 7B. If the reject signal has not been received, the control unit 100c proceeds to step 7a.

In step 7B, the control unit 100c discriminates whether or not an elapsed time T that has elapsed after reception of the reject signal is equal to or longer than a preset threshold time Trej. If the elapsed time T is equal to or longer than a preset threshold time Trej, the control unit 100c proceeds to step 7a. If the elapsed time T is shorter than a preset threshold time Trej, the control unit 100c proceeds to step 7C.

In step 7C, the control unit 100c sets a control flag relating to discrimination in step 7H to be described later to "1" and stores the control flag in the control flag storage area 1044. Then, the control unit 100c proceeds to step 7a. The control flag stored in the control flag storage area 1044 is reset to "0" when the processing of FIG. 7 is started.

The control unit 100c sets a counter value k representing the number of execution of the cell search at an initial value 0 in step 7a, and proceeds to step 7b. Subsequently, the control unit 100c executes the cell search and stores the information of the cells detected by the cell search in the candidate cell information storage area 1043 in step 7b, and proceeds to step 7c.

The concrete processing of the cell search is controlling the sender-receiver unit 102, sequentially assigning various kinds of carrier frequencies and spread codes thereto, searching for a pilot signal transmitted from the base station BS, detecting maximum number n of cells suitable for reception (n>1), deleting the cell information which has been stored in the candidate cell information storage area 1043 (i.e. the information which has been obtained at the previous cell search), and storing the reception levels of the pilot signals corresponding to the cells detected at the current cell search, and each of identification information items of the frequencies and spread codes used for the reception, in association with each other, in the candidate cell information storage area 1043.

The control unit 100c adds "1" to the counter value k in step 7c, and proceeds to step 7d.

In step 7d, the control unit 100c discriminates whether or not the cells could be successfully detected by the cell search executed in step 7b, by referring to the information stored in the candidate cell information storage area 1043. If the cells could be successfully detected, control unit 100c proceeds to step 7f. If the cells could not be detected, control unit 100c proceeds to step 7e.

In step 7e, the control unit 100c discriminates whether or not the counter value k is equal to or greater than a preset threshold value kmax. If the counter value k is equal to or greater than a preset threshold value kmax, i.e. if the cell search of step 7b is executed at kmax or more times, the control unit 100c ends this processing, urges the display means to display that the radio communication terminal is located out of service area, and executes the out-of-area processing.

On the other hand, if the counter value k is smaller than the preset threshold value kmax, i.e. if the cell search of step 7b is not executed at kmax or more times, the control unit 100c proceeds to step 7b and executes the cell search again.

In step 7f, the control unit 100c selects the cell corresponding to the pilot signal of the highest reception level, of the cells stored in the candidate cell information storage area 1043 in step 7b. Then, the control unit 100c proceeds to step 7g.

In step 7g, the control unit 100c discriminates whether or not the cell selected in step 7f is stored in the cell information storage area 1041, by referring to the identification information of the spread codes stored in the cell information storage area 1041.

If the cell selected in step 7f is stored in the cell information storage area 1041, the control unit 100c discriminates the selected cell as the cell which has been detected, and proceeds to step 7H. If the cell selected in step 7f is not stored in the cell information storage area 1041, the control unit 100c discriminates the selected cell as the cell which has not been detected, and proceeds to step 7o.

In step 7H, the control unit 100c detects the identification information of the position registration area which is associated with the cell selected in step 7f in the cell information storage area 1041, and discriminates whether or not the detected identification information matches the identification information of the position registration area where the previous position registration has been executed as stored in the position registration area storage area 1042a. If the identification information items of the two position registration areas match, the control unit 100c proceeds to step 7m. If the identification information items do not match, the control unit 100c proceeds to step 7i.

In step 7H, the control unit 100c refers to the control flag stored in the control flag storage area 1044. If "0" is stored as the control flag, the control unit 100c executes the general processing. If "1" is stored as the control flag, the control unit 100c executes the reverse processing.

When the control unit 100c executes the general processing, the control unit 100c detects the identification information of the position registration area which is associated with the cell selected in step 7f in the cell information storage area 1041, and discriminates whether or not the detected identification information matches the identification information of the position registration area where the previous position registration has been executed as stored in the position registration area storage area 1042a. If the identification information items of the two position registration areas match, the control unit 100c proceeds to step 7m. If the identification information items do not match, the control unit 100c proceeds to step 7i.

On the other hand, when the control unit 100c executes the reverse processing, the control unit 100c, similarly to the general processing, executes the general processing, the control unit 100c detects the identification information of the position registration area which is associated with the cell selected in step 7f in the cell information storage area 1041, and discriminates whether or not the detected identification information matches the identification information of the position registration area where the previous position registration has been executed as stored in the position registration area storage area 1042a.

In the discrimination, however, the control unit 100c proceeds to the steps, oppositely to the general processing. In other words, if the identification information items of the two position registration areas match, the control unit 100c proceeds to step 7i. If the identification information items do not match, the control unit 100c proceeds to step 7m.

In step 7i, the control unit 100c discriminates whether or not the counter value k is equal to or greater than the preset threshold value kmax. If the counter value k is equal to or greater than the threshold value kmax, i.e. if the cell search of step 7b is executed at kmax or more times, the control unit 100c proceeds to step 7j to receive the cell information from the cell selected in step 7f.

If the counter value k is smaller than the threshold value kmax, i.e. if the cell search of step 7b is not executed at kmax or more times, the control unit 100c proceeds again to step 7b and executes the cell search again.

In step 7j, the control unit 100c reads the identification information of the frequency and spread code corresponding to the cell selected in step 7f from the cell information storage area 1041, controls the sender-receiver unit 102 on the basis of these information items, and receives the cell information transmitted from the base station BS corresponding to the cell selected in step 7f. Then, the control unit 100c proceeds to step 7k.

In step 7k, the control unit 100c updates the information corresponding to the cell selected in step 7f, of the information stored in the cell information storage area 1041, on the basis of the cell information received in step 7j. Then, the control unit 100c proceeds to step 7L. By the updating, the cell information received in step 7j is stored in the cell information storage area 1041 as the latest information.

In step 7L, the control unit 100c controls the sender-receiver unit 102 on the basis of the information received in step 7j and executes the position registration processing through the cell selected in step 7f. In the mobile communications system accommodating the base station BS, the mobile radio terminal apparatus thereby executes various kinds of controls such as sending and receiving as if the terminal apparatus existed in the cell selected in step 7f.

In step 7L, the control unit 100c also stores the identification information of the position registration area corresponding to the cell selected in step 7f, as the area where the previous position registration has been executed, in the position registration area storage area 1042a, and ends the processing. If the reject signal is received at the position registration, the control unit 100c also stores the information indicating the reception of the reject signal.

In step 7m, the control unit 100c reads the identification information of the frequency and spread code corresponding to the cell selected in step 7f from the cell information storage area 1041, controls the sender-receiver unit 102 on the basis of these information items, and receives the cell information transmitted from the base station BS corresponding to the cell selected in step 7f. Then, the control unit 100c proceeds to step 7n.

In step 7n, the control unit 100c updates the information corresponding to the cell selected in step 7f, of the information stored in the cell information storage area 1041, on the basis of the cell information received in step 7m, and ends this processing. By the updating, the cell information received in step 7m is stored in the cell information storage area 1041 as the latest information.

In step 7o, the control unit 100c discriminates whether or not the counter value k is equal to or greater than the preset threshold value kmax. If the counter value k is equal to or greater than the threshold value kmax, i.e. if the cell search of step 7b is executed at kmax or more times, the control unit 100c proceeds to step 7p to receive the cell information from the cell selected in step 7f.

If the counter value k is smaller than the threshold value kmax, i.e. if the cell search of step 7b is not executed at kmax or more times, the control unit 100c proceeds again to step 7b and executes the cell search again.

In step 7p, the control unit 100c reads the identification information of the frequency and spread code corresponding to the cell selected in step 7f from the cell information storage area 1041, controls the sender-receiver unit 102 on the basis of these information items, and receives the cell information transmitted from the base station BS corresponding to the cell selected in step 7f. Then, the control unit 100c proceeds to step 7q.

In step 7q, on the basis of the cell information received in step 7p, the control unit 100c additionally stores the identification information of the spread code corresponding to the cell selected in step 7f, the identification information of the search frequency utilized to receive the pilot signal transmitted from the cell, and the identification information of the position registration area to which the cell belongs, in association with one another, as the latest information, in the cell information storage area 1041. Then, the control unit 100c proceeds to step 7r. By the additional storing, the oldest information, of the information items stored in the cell information storage area 1041, is deleted.

In step 7r, the control unit 100c detects the identification information of the position registration area corresponding to the cell selected in step 7f in the cell information storage area 1041 and discriminates whether or not the detected identification information matches the identification information of the position registration area which is stored in the position registration area storage area 1042a and in which the previous position registration has been executed. If the identification information items of the two position registration areas match, the control unit 100c ends the processing. If the identification information items of the two position registration areas do not match, the control unit 100c proceeds to step 7S.

In step 7S, the control unit 100c controls the sender-receiver unit 102 on the basis of the information received in step 7p and executes the position registration through the cell selected in step 7f. In the mobile communications system accommodating the base station BS, the mobile radio terminal apparatus thereby executes various kinds of controls such as sending and receiving as if the terminal apparatus existed in the cell selected in step 7f.

In step 7S, the control unit 100c stores the identification information of the position registration area corresponding to the cell selected in step 7f, as the area where the previous position registration has been executed, in the position registration area storage area 1042a, and ends the processing. If the reject signal is received at the position registration, the control unit 100c also stores information indicating the reception of the reject signal.

In the mobile radio terminal apparatus having the above-described structure, the identification information of the cell which has received the cell information, and the identification information of the position registration area to which the cell belongs, are stored in association with each other, in the cell information storage area 1041, and the identification information of the position registration area where the previous position registration has been executed is stored in the position registration area storage area 1042a together with the information indicating whether or not the reject signal has been received.

In a case where the reject signal is not received at the position registration, if, as a result of the cell search, the detected cell is not stored in the cell information storage area 1041, i.e. the detected cell has not been detected or does not belong to the position registration area where the previous position registration has been executed, the cell search is executed again.

On the other hand, the cell information is received with priority, in relation to the cell stored in the cell information storage area 1041, which has been detected and which belongs to the position registration area where the previous position registration has been executed. In other words, the cell which has been detected and which belongs to the position registration area where the previous position registration has been executed, is handled as a cell relating to the cell information which is to be received with priority.

Therefore, according to the mobile radio terminal apparatus having the above-described structure, even if the cell information is received, the position registration does not need to be executed, in relation to the cell which has been detected and which belongs to the position registration area where the previous position registration has been executed.

By handling such a cell as a cell relating to the cell information which is to be received with priority, the number of execution of the position registration can be decreased, unnecessary occurrence of the position registration can be thereby restricted and the power consumption can be reduced.

If, as a result of the cell search, the detected cell is not stored in the cell information storage area 1041, i.e. the detected cell has not been detected or does not belong to the position registration area where the previous position registration has been executed, the cell search is executed again. However, when the number of execution of the cell search reaches the threshold value kmax, the cell information is received and the position registration is executed even if the cell is not stored in the cell information storage area 1041 or does not belong to the position registration area where the previous position registration has been executed.

For this reason, even if the cell which is stored in the cell information storage area 1041 and which belongs to the position registration area where the previous position registration has been executed cannot be found, the position registration is executed soon. Even if the position registration needs to be executed together with the movement of the mobile radio terminal apparatus, normal operations can be executed.

In a case where the reject signal is received at the position registration, if the cell detected as a result of the cell search by reversing the discrimination of step 7H, has not been detected or belongs to the position registration area where the previous position registration has been executed, the cell search is executed again.

On the other hand, the cell information is received with priority, in relation to the cell which has been detected and which does not belong to the position registration area where the previous position registration has been executed. In other words, the cell which has been detected and which does not belong to the position registration area where the previous position registration has been executed, is handled as a cell relating to the cell information which is to be received with priority.

Therefore, according to the mobile radio terminal apparatus having the above-described structure, the number of execution of the position registration can be decreased, unnecessary occurrence of the position registration can be thereby restricted and the power consumption can be reduced by handling the cell which has been detected and whose connection is not rejected as a cell relating to the cell information which is to be received with priority.

The present invention is not limited to the embodiment described above but can be modified in various manners. For example, the counter value k is incremented in step 7c, commonly to the proceeding from step 7a to step 7b, the proceeding from step 7e to step 7b, the proceeding from step 7i to step 7b, and the proceeding from step 7o to step 7b.

Instead of this, for example, different counter values k may be used in accordance with the processes of proceeding to step 7b, and the counter values k corresponding to steps 3e, 3i and 3o may be discriminated in the respective steps.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile radio terminal apparatus, for use in a mobile radio communications system including a plurality of cells belonging to different position registration areas, to make radio communications through the cells, the apparatus comprising:

a receiver which receives, from the cells, cell information including identification information of the position registration areas to which the cells belong;

a detector which detects identification information of one of the position registration areas where previous position registration has been executed;

a position registration area memory unit which stores said identification information detected by the detector in a position registration area memory;

a cell information memory unit which stores, in a cell information memory, the identification information of the position registration areas included in the cell information and identification information of the cells in association with each other if the cell information is received from the cells; and a controller which controls the receiver to specify a cell belonging to said one of the position registration areas of said identification information stored by the position registration area memory unit and receive the cell information from the cell with priority, based on the information stored by the position registration area memory unit and the information stored by the cell information memory unit, wherein the position registration area memory unit further stores reject information indicating whether a reject signal for rejecting connection has been received from the cell belonging to said position registration area where the previous position registration has been executed, and the controller is arranged so that, if the reject information is received the cell, the controller controls the receiver to specify the cell belonging to said position registration area of said identification information stored by the position registration area memory unit and receive the cell information from the cell with non-priority, based on the information stored by the position registration area memory unit and the information stored by the cell information memory unit, and if the reject information is not received from the cell, the controller controls the receiver to specify the cell belonging to said position registration area of said identification information stored by the position registration area memory unit and receive the cell information from the cell with priority based on the information stored by the position registration area memory unit and the information stored by the cell information memory unit, wherein, if the cell information is received from the cell with priority, the controller controls the receiver not to execute new position registration with respect to the cell, and if new cell information from another cell is received, the controller controls the receiver to execute new position registration with respect to said another cell.

2. A mobile radio terminal apparatus, for use in a mobile radio communications system including a plurality of cells belonging to different position registration areas, to make radio communications through the cells, the apparatus comprising:

a cell detector which detects the cells;
a receiver which receives, from the detected cells, cell information including identification information of the position registration areas to which the cells belong;
a detector which detects identification information of one of the position registration areas where previous position registration has been executed;
a position registration area memory unit which stores said identification information detected by the detector in a position registration area memory;
a cell information memory unit which stores, in a cell information memory the identification information of the position registration areas included in the cell information and the identification information of the cells in association with each other if the cell information is received from the cells; and
a controller which repeatedly controls the cell detector to detect a cell belonging to said one of the position registration areas of said identification information stored by the position registration area memory unit, based on the information stored by the position registration area memory unit and the information stored by the cell information memory unit, and controls the receiver to (i) receive the cell information from the cell if the cell is detected while the repeated control is executed at a number of times equal to or less than a preset number of times or (ii) receive cell information from any one of the cells other than the cell belonging to said position registration area of said identification information stored by the position registration area memory unit if the cell is not detected by executing the repeated control at the number of times,
wherein the position registration area memory unit further stores reject information indicating whether a reject signal for rejecting connection has been received from the cell belonging to said position registration area where the previous position registration has been executed, and
the controller is arranged so that, if the reject information is received from the cell, the controller controls the receiver to specify the cell belonging to said position registration area of said identification information stored by the position registration area memory unit and receive the cell information from the cell with non-priority, based on the information stored by the position registration area memory unit and the information stored by the cell information memory unit, and if the reject information is not received from the cell, the controller controls the receiver to specify the cell belonging to said position registration area of said identification information stored by the position registration area memory unit and receive the cell information from the cell with priority, based on the information stored by the position registration area memory unit and the information stored by the cell information memory unit, wherein, if the cell information is received from the cell with priority, the controller controls the receiver not to execute new position registration with respect to the cell, and if new cell information from another cell is received, the controller controls the receiver to execute new position registration with respect to said another cell.

3. A mobile radio terminal apparatus, for use in a mobile radio communications system including a plurality of cells belonging to different position registration areas, to make radio communications through the cells, the apparatus comprising:

a receiver which receives, from the cells, cell information including identification information of the position registration areas to which the cells belong;
a cell detector which detects the cells;
a detector which detects identification information of one of the position registration areas where previous position registration has been executed;
a position registration area memory unit which stores said identification information detected by the detector in a position registration area memory;
a cell information memory unit which stores, in a cell information memory, the identification information of the position registration areas included in the cell information and the identification information of the cells in association with each other if the cell information is received from the cells; and
a controller which controls the receiver to specify a cell belonging to said one of the position registration areas of said identification information stored by the position registration area memory unit based on the information stored by the position registration area memory unit and the information stored by the cell information memory unit, and to receive the cell information from the specified cell if the specified cell is included in the cells detected by the cell detector,
wherein the position registration area memory unit further stores reject information indicating whether a reject signal for rejecting connection has been received from the cell belonging to said position registration area where the previous position registration has been executed, and
the controller is arranged so that, if the reject information is received from the cell, the controller controls the receiver to specify the cell belonging to said position registration area of said identification information stored by the position registration area memory unit and receive the cell information from the cell with non-priority, based on the information stored by the position registration area memory unit and the information stored by the cell information memory unit, and if the reject information is not received from the cell, the controller controls the receiver to specify the cell belonging to said position registration area of said identification information stored by the position registration area memory unit and receive the cell information from the cell with priority, based on the information stored by the position registration area memory unit and the information stored by the cell information memory unit, wherein, if the cell information is received from the cell with priority, the controller controls the receiver not to execute new position registration with respect to the cell, and if new cell information from another cell is received, the controller controls the receiver to execute new position registration with respect to said another cell.

4. The mobile radio terminal apparatus according to claim 3, wherein the cell detector detects reception levels of signals from the cells; and if the specified cell is not included in the cells detected by the cell detector, the controller receives the cell information from the cell having the highest reception level from among the cells detected by the cell detector.

5. A mobile radio method, for use in a mobile radio communications system including a plurality of cells belonging to different position registration areas, to make radio communications through the cells, the method comprising:

receiving, from the cells, cell information including identification information of the position registration areas to which the cells belong;
detecting identification information of one of the position registration areas where previous position registration has been executed;
storing the detected said identification information;
storing the identification information of the position registration areas included in the cell information and identification information of the cells in association with each other if the cell information is received from the cells;
controlling the receiving to specify a cell belonging to said one of the position registration areas of said identification information and to receive the cell information from the cell with priority, based on the stored information and the stored identification information; and
storing reject information indicating whether a reject signal for rejecting connection has been received and, if reject information to reject connection is received, the receiving is controlled to specify the cell belonging to the said position registration area and to receive the cell information from the cell with non-priority, based on the stored information and the stored identification information, and if the reject information to reject connection is not received, the receiving is controlled to receiver to specify the cell belonging to said position registration area and receives the cell information from the cell with priority, based on the reject information and the identification information of the position registration areas,
wherein, if cell information is received with priority, controlling the receiving not to execute new position registration with respect to the cell, and if new cell information from another cell is received, controlling the receiving to execute new position registration with respect to said another cell.

6. The method according to claim 5, wherein the controlling comprises controlling the receiving to specify the cell belonging to the stored position registration area and to receive the cell information from the cell with priority when the identification information of the position registration area included in the received cell information is stored.

7. The method according to claim 5, wherein the controlling comprises controlling the receiving to receive new cell information from the cells including identification information of the position registration areas to which the cells belong when the identification information of the position registration area included in the received cell information is not stored.

8. A mobile radio method, for use in a mobile radio communications system including a plurality of cells belonging to different position registration areas, to make radio communications through the cells, the method comprising:
detecting the cells;
receiving, from the detected cells, cell information including identification information of the position registration areas to which the cells belong;
detecting identification information of one of the position registration areas where previous position registration has been executed;
storing said detected identification information;
storing the identification information of the position registration areas included in the cell information and identification information of the cells in association with each other if the cell information is received from the cells;
repeatedly controlling the detecting to detect a cell belonging to said one of the stored position registration areas of said identification information, based on the stored information and the stored identification information, and (i) controlling the receiving to receive cell information from the cell if the cell is detected while the repeated control is executed at number of times equal to or smaller than a preset number of times, or (ii) controlling the receiving to receive cell information from anyone of the cells other than the cell belonging to said stored position registration area if the cell is not detected by executing the repeated control at the preset number of times; and
storing reject information indicating whether a reject signal for rejecting connection has been received and, if reject information to reject connection is received, the receiving is controlled to specify the cell belonging to the said position registration area and to receive the cell information from the cell with non-priority, based on the stored information and the stored identification information, and if the reject information to reject connection is not received, the receiving is controlled to receiver to specify the cell belonging to said one of the position registration areas and receives the cell information from the cell with priority, based on the reject information and the identification information of the position registration areas,
wherein, if cell information is received with priority, controlling the receiving not to execute new position registration with respect to the cell, and if new cell information from another cell is received, controlling the receiving to execute new position registration with respect to said another cell.

9. A mobile radio method, for use in a mobile radio communications system including a plurality of cells belonging to different position registration areas, to make radio communications through the cells, the method comprising:
receiving, from the cells, cell information including identification information of the position registration areas to which the cells belong;
detecting the cells;
detecting identification information of one of the position registration areas where previous position registration has been executed;
storing said detected identification information ;
storing the identification information of the position registration areas included in the cell information and identification information of the cells in association with each other if the cell information is received from the cells; and
controlling the receiving to (i) specify a cell belonging to the said one of the position registration areas of said identification information based on the stored information and the stored identification information, and (ii) receive cell information from the specified cell if the specified cell is included in the plurality of detected cells; and
storing reject information indicating whether a reject signal for rejecting connection has been received and, if reject information to reject connection is received, the receiving is controlled to specify the cell belonging to the position registration area and to receive the cell information from the cell with non-priority, based on the stored information and the stored identification information, and if the reject information to reject connection is not received, the receiving is controlled to receiver to specify the cell belonging to said position registration area and receives the cell information from the cell with priority, based on the reject information and the identification information of the position registration areas, wherein, if cell information is received with priority, controlling the receiving not to execute new position registration with respect to the cell, and if new cell information from another cell is received, controlling the receiving to execute new position registration with respect to said another cell.

10. The method according to claim 9, wherein the detecting comprises detecting reception levels of signals from the cells; and if the specified cell is not included in the detected cells, the cell information is received from the cell having the highest reception level from among the detected cells.

* * * * *